(12) United States Patent
Lorkowski et al.

(10) Patent No.: US 8,006,941 B2
(45) Date of Patent: Aug. 30, 2011

(54) SYSTEM FOR REDUCING AERODYNAMIC NOISE AT A SUPPLEMENTARY WING OF AN AIRCRAFT

(75) Inventors: Thomas Lorkowski, Taufkirchen (DE); Boris Grohmann, Taufkirchen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 12/829,831

(22) Filed: Jul. 2, 2010

(65) Prior Publication Data

US 2010/0282900 A1 Nov. 11, 2010

Related U.S. Application Data

(62) Division of application No. 11/791,367, filed as application No. PCT/DE2005/002003 on Nov. 9, 2005, now Pat. No. 7,766,281.

(30) Foreign Application Priority Data

Nov. 23, 2004 (DE) .................. 10 2004 056 537

(51) Int. Cl.
*B64C 3/50* (2006.01)
(52) U.S. Cl. ........ 244/215; 244/210; 244/198; 244/213; 244/214
(58) Field of Classification Search .................. 244/198, 244/210, 213, 214, 215, 216
See application file for complete search history.

(56) References Cited

U.S. PATENT DOCUMENTS

| | | | |
|---|---|---|---|
| 4,418,610 A | 12/1983 | Holtrop | |
| 5,056,741 A | 10/1991 | Bliesner et al. | |
| 5,590,854 A | 1/1997 | Shatz | |
| 6,209,825 B1 | 4/2001 | Scott | |
| 6,220,549 B1 | 4/2001 | Tsunoda et al. | |
| 6,247,670 B1 | 6/2001 | Eliahou-Niv et al. | |
| 6,328,265 B1 | 12/2001 | Dizdarevic | |
| 6,394,396 B2 | 5/2002 | Gleine et al. | |
| 6,454,219 B1 | 9/2002 | Moe | |
| 6,457,680 B1 | 10/2002 | Dobrzynski et al. | |
| 6,536,714 B2 | 3/2003 | Gleine et al. | |
| 6,676,073 B2 | 1/2004 | Thomassey | |
| 6,755,375 B2 | 6/2004 | Trikha | |
| 6,776,376 B2 | 8/2004 | Collins | |

(Continued)

FOREIGN PATENT DOCUMENTS

DE 715 266 12/1941

(Continued)

OTHER PUBLICATIONS

International Search Report dated Jan. 20, 2006 with an English translation of the pertinent portion (Fifteen (15) pages).

(Continued)

*Primary Examiner* — Tien Dinh
*Assistant Examiner* — Justin Benedik
(74) *Attorney, Agent, or Firm* — Crowell & Moring LLP (57) ABSTRACT

A system for reducing aerodynamic noise of a supplementary wing of an aircraft is provided. The supplementary wing is hinged to a main wing and is extendable when a gap region between the main wing and the supplementary wing is opened. The system includes a separating surface which can be moved into the gap region when the supplementary wing is extended and which extends at least partially along a separation flow line between a vortex flow region and a gap flow for the air flowing in the gap region. The separating surface is an n-stable surface which through an actuator device can be moved between at least one of the stable states and at least one additional state.

15 Claims, 6 Drawing Sheets

U.S. PATENT DOCUMENTS 6,789,769 B2 9/2004 Mau et al.

FOREIGN PATENT DOCUMENTS

| DE | 199 25 560 A1 | 12/2000 |
| DE | 100 19 185 A1 | 10/2001 |
| DE | 100 19 187 C1 | 1/2002 |
| DE | 101 58 849 A1 | 6/2003 |
| EP | 0 375 382 A2 | 6/1990 |
| FR | 1 011 175 | 6/1952 |

OTHER PUBLICATIONS

PCT/IPEA/409 dated Apr. 2005 with an English translation of the pertinent portions (sixteen (16) pages).

SYSTEM FOR REDUCING AERODYNAMIC NOISE AT A SUPPLEMENTARY WING OF AN AIRCRAFT

CROSS REFERENCE TO RELATED APPLICATIONS

This application is a divisional of U.S. patent application Ser. No. 11/791,367, accepted into the U.S. National Stage on Dec. 7, 2007, which is the U.S. National Stage of International PCT Application No. PCT/DE2005/002003, filed Nov. 9, 2005, the entire disclosure of which is expressly incorporate herein by reference and which claims priority under 35 U.S.C. §119 to German Patent Application No. 10 2004 056 537.6 filed Nov. 23, 2004, the entire disclosure of which is also expressly incorporated herein by reference.

BACKGROUND AND SUMMARY OF THE INVENTION

The invention relates to a system for reducing aerodynamic noise at a supplementary wing of an aircraft hinged to a main wing and extendable to open a gap between the main wing and the supplementary wing.

Modern commercial aircraft have high-lift components in the form of supplementary wings, such as, for example, movable slats or landing flaps provided on the front edge of the main wing which are actuated during takeoff and landing for increasing the lift at low speeds. These supplementary wings are hinged to the main wing, and may be extended when a gap region between the main wing and the supplementary wing is opened. A significant problem is that when the supplementary wing is extended, considerable aerodynamic noise is generated due to turbulent flow in the gap region which is perceived to be very objectionable, in particular at ground level.

A channel is provided on the back side of a slat, for example, in which in the extended state of the slat a flow separation region of the gap flow develops in the form of a vortex. This vortex is constantly supplied with new energy from the adjoining gap flow. Turbulence balls enter the accelerated gap flow via a separation flow line between the vortex flow region and the gap flow, generating noise. However, noise is radiated through the outward flow of the turbulence balls over the rear edge of the slat.

Various systems are known from the prior art for reducing this aerodynamic noise at the supplementary wing of a commercial aircraft, in which a separating surface is provided which can be moved into the gap region when the supplementary wing is extended and which is elongated in the direction of the span width and extends at least partially along a separation flow line between the vortex flow region and a gap flow of the air flowing in the gap region between the supplementary wing and the main wing.

A supplementary wing for the main wing of aircraft is known from German Patent Document DE 199 25 560 A1, for example, in which such a system is provided for reducing aerodynamic noise in the form of a separating surface situated on the supplementary wing which extends in the direction of the main wing and runs along a separation flow line between the vortex flow region and the gap flow of the air flowing between the supplementary wing and the main wing. This separating surface may have a rigid form, whereby it is hinged to the supplementary wing and is pivotable when the supplementary wing is retracted on the main wing, or when the angular position of the separating surface must be modified when the pitch angle of the aircraft changes. On the other hand, the separating surface may also have a flexible design, for example in the form of an inflatable balloon or displacement body which is affixed to the supplementary wing and which may be impinged on with pressure when the supplementary wing is extended.

A system for reducing aerodynamic noise at a slat of a commercial aircraft is known from German Patent Document DE 100 19 185 A1, for example, in which a hollow displacement body is provided in a profile curvature, adapted to the outer contour of the main wing, on the back side of the slat which by use of a controlled bleed air line is optionally inflatable, thereby forming a separating surface which separates the vortex flow region from the gap flow in the gap region between the slat and main wing.

In a further system for reducing aerodynamic noise at a slat of a commercial aircraft, known from German Patent Document DE 101 57 849 A1, a separating surface which extends partially along a separation flow line between the vortex flow region and the gap flow of the air flowing in the gap region between the supplementary wing and the main wing is formed from multiple brush hairs, arranged in series, which are distributed over the span width of the slat and are aligned in at least one row.

A further system for reducing aerodynamic noise at a slat of a commercial aircraft is known from German Patent Document DE 100 19 187 C1, in which a separating surface between the vortex flow region and the gap flow of the air flowing in the gap region between the supplementary wing and the main wing is formed by a displacement body which may be inflated by bleed air.

The disadvantage of systems in the form of flaps, sheets, or the like is that such structures are usually not able to sufficiently mask or cover the vortex flow region. Noise-radiating turbulence may form at another location. In addition, a complicated kinematic actuator system is necessary for actuating and controlling such structures.

Although inflatable structures having elastic or "soft" surfaces may conform well to the desired contour, implementation in a technical system is difficult. Complicated valve connections are usually necessary to control the air intake and exhaust. In addition, when bleed air is used, special materials must be chosen due to the high temperature of the bleed air which is typically equal to or greater than 280° C. A further disadvantage is that suitable elastic materials are susceptible to aging and damage and are not resistant to UV radiation, which significantly limits the useful life and greatly increases the maintenance effort.

The present invention, therefore, provides an improved system for reducing aerodynamic noise at a supplementary wing of an aircraft, which in particular has a simple design and which may be operated easily, reliably, and consistently. A further aim is that the system is reliable with respect to breakdowns.

Advantageous embodiments and refinements of the system according to the invention are described below. In one exemplary embodiment, the invention provides a system for reducing aerodynamic noise at a supplementary wing of an aircraft which is hinged to a main wing and is extendable when a gap region between the main wing and the supplementary wing is opened. The system has a separating surface which can be moved into the gap region when the supplementary wing is extended and which is elongated in the direction of the span width and which extends at least partially along a separation flow line between a vortex flow region and a gap flow of the air flowing in the gap region between the supplementary wing and the main wing. According to the invention, the separating surface is an n-stable surface which by using an actuator device can be moved between at least one of the stable states and at least one additional state.

The exemplary approach according to the invention allows the channels in supplementary wings or main wings which produce vortex flows on the aerodynamically active surface to be moved in a simple manner so that the formation of turbulence is completely or significantly reduced.

According to one advantageous embodiment of the system according to the invention, the separating surface is a monostable (n=1) surface which automatically assumes a stable state from which it may be moved by actuation of the actuator device.

The monostable separating surface may be designed such that it automatically returns to the stable state when the actuation of the actuator device ceases or breaks down. This has the advantage that breakdown protection is ensured in a simple manner, since the separating surface may be moved from its stable state to an additional state only by actuation of the actuator device, and resides in this additional state only for as long as the actuator device is active. When the actuation ends, i.e., when the actuator device is inactive, which may also be caused by a breakdown of the actuator device, the separating surface automatically returns to its stable state.

In its stable state the monostable separating surface preferably assumes a position that is retracted from the gap region and in which the supplementary wing is retractable on the main wing when the gap region is closed, and when the gap region is opened by extension of the supplementary wing as the result of or during the actuation of the actuator device, the monostable separating surface assumes an advanced position in which the separating surface at least partially separates the vortex flow region from the gap flow or occupies the space thereof. This has the advantage that if the actuator device breaks down, the separating surface automatically returns to its retracted position so that the supplementary wing may easily retract in an emergency. The latter must be ensured to comply with safety requirements for commercial aircraft.

It is practical for the monostable separating surface to be made of a material having spring-elastic structural properties. Alternatively or additionally, further devices, in particular a spring device (elastic spring, foam, or the like) may be provided whose action causes the separating surface to automatically return to its stable state.

According to another advantageous embodiment of the system according to the invention, the separating surface is a bistable (n=2) surface having two stable states between which the separating surface may be moved by actuation of the actuator device. This has the advantage that the actuator device need be activated only for moving the separating surface from a stable state to another stable state. The two stable states are each maintained without influence by the actuator device or influence by actuating forces, which simplifies control of the actuator device and optionally reduces the power consumption thereof.

This exemplary embodiment is preferably designed in such a way that in one of its stable states the bistable separating surface assumes a position that is retracted from the gap region and in which the supplementary wing is retractable on the main wing when the gap region is closed. In its other stable state, when the gap region is opened by extension of the supplementary wing, the bistable separating surface assumes an advanced position in which the separating surface at least partially separates the vortex flow region from the gap flow or occupies the space thereof. In this embodiment, breakdown protection is advantageously ensured by the fact that the supplementary wing during an emergency retraction presses against the extended or advanced separating surface, with the result that in a manner of speaking the separating surface is "snapped" and converts to its other stable state, the engaged or retracted state.

The two stable states of the exemplary bistable separating surface may be automatically established by virtue of the spring-elastic structural properties of the separating surface, by locking devices—as used in bicycle connections, for example—and/or by separate devices, in particular a spring device.

According to further advantageous embodiments, the separating surface is an n-stable (n≧3) surface which is able to assume n (n≧3) stable states, between which the separating surface is movable by actuation of the actuator device. For example, n may be advantageously 3, 4, 5 . . . or 10.

It is practical for the n-stable separating surface in at least one of its stable states to assume a position that is retracted from the gap region, in which the supplementary wing is retractable at the main wing when the gap region is closed, whereby when the gap region is opened by extension of the supplementary wing the n-stable separating surface assumes an advanced position in which the separating surface at least partially separates the vortex flow region from the gap flow or occupies the space thereof.

For the exemplary n-stable (n≧3) separating surface, the n-stable states may advantageously be automatically established by locking devices, as previously described in conjunction with a bistable separation surface, and/or by additional devices, in particular a spring device (elastic spring, foam, or the like).

According to one advantageous embodiment of the invention, the separating surface is a surface that at least partially covers the vortex flow region and is supported in an articulated manner on at least one side or fixedly clamped on at least one side, along a line running in the direction of the span width.

According to an alternative advantageous embodiment of the invention, the separating surface is a surface that at least partially or completely covers the vortex flow region and is supported on both sides along lines running in the direction of the span width.

According to one preferred embodiment, the dimensions of the separating surface between the lines running in the direction of the span width, along which the separating surface is supported, may be larger than the distance between these lines.

According to another embodiment of the invention, the separating surface may be supported in an articulated manner on both sides along the lines running in the direction of the span width.

According to an alternative embodiment, the separating surface is fixedly clamped on one side, and on the other side is supported in an articulated manner along a line running in the direction of the span width.

According to a further alternative, the separating surface is also fixedly clamped on both sides along lines running in the direction of the span width.

According to yet another advantageous embodiment of the invention, the separating surface is formed by a flexible planar material.

The planar material may be a flexible metal sheet, a fiberglass fiber-reinforced plastic (FRP), a carbon fiber-reinforced plastic (CRP), a fiber-reinforced polymer, or a fiber-reinforced elastomer.

The actuator device may include a rotary actuator which is coupled to the separating surface on at least one side on which the separating surface is supported, along the lines running the direction of the span width in order to move the separating surface between the at least one stable state and the at least one additional state.

The actuator device may also include a linear actuator which is coupled to the separating surface for moving it between the at least one stable state and the at least one additional state.

However, the actuator device may also include a fluid actuator which is coupled to the separating surface for moving same between the at least one stable state and the at least one additional state, the fluid actuator having a displacement body provided in the vortex flow region which may be impinged on by fluid.

The exemplary actuator device may be driven by a servomotor, an electric motor, or an electromagnet.

However, the actuator device may also be a pneumatic or hydraulic actuator.

The actuator device may have a single- or double-acting design, whereby "double-acting" is understood to mean that the actuator is able to produce force effects in opposite directions; i.e., the actuator may pull as well as push.

The actuator device may have a doubly or multiply redundant design.

According to a further embodiment, the actuator device may be designed as a cable, lever, drive pin, or the like, and the actuator device may be preferably kinetically coupled to an actuating device for retracting or extending the supplementary wing.

On the back side of the wing to which the separating surface is mounted, a channel is preferably provided in which the separating surface may be moved into a position that is retracted from the gap region and in which the supplementary wing may be retracted on the main wing when the gap region is closed.

It is particularly advantageous when the contour of the separating surface in the retracted position is adapted substantially to the contour of the channel.

According to one particularly advantageous embodiment of the invention, the supplementary wing is a slat or a landing flap.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention are explained below with reference to the drawing, which shows the following.

DETAILED DESCRIPTION OF THE DRAWINGS

Figure 1:
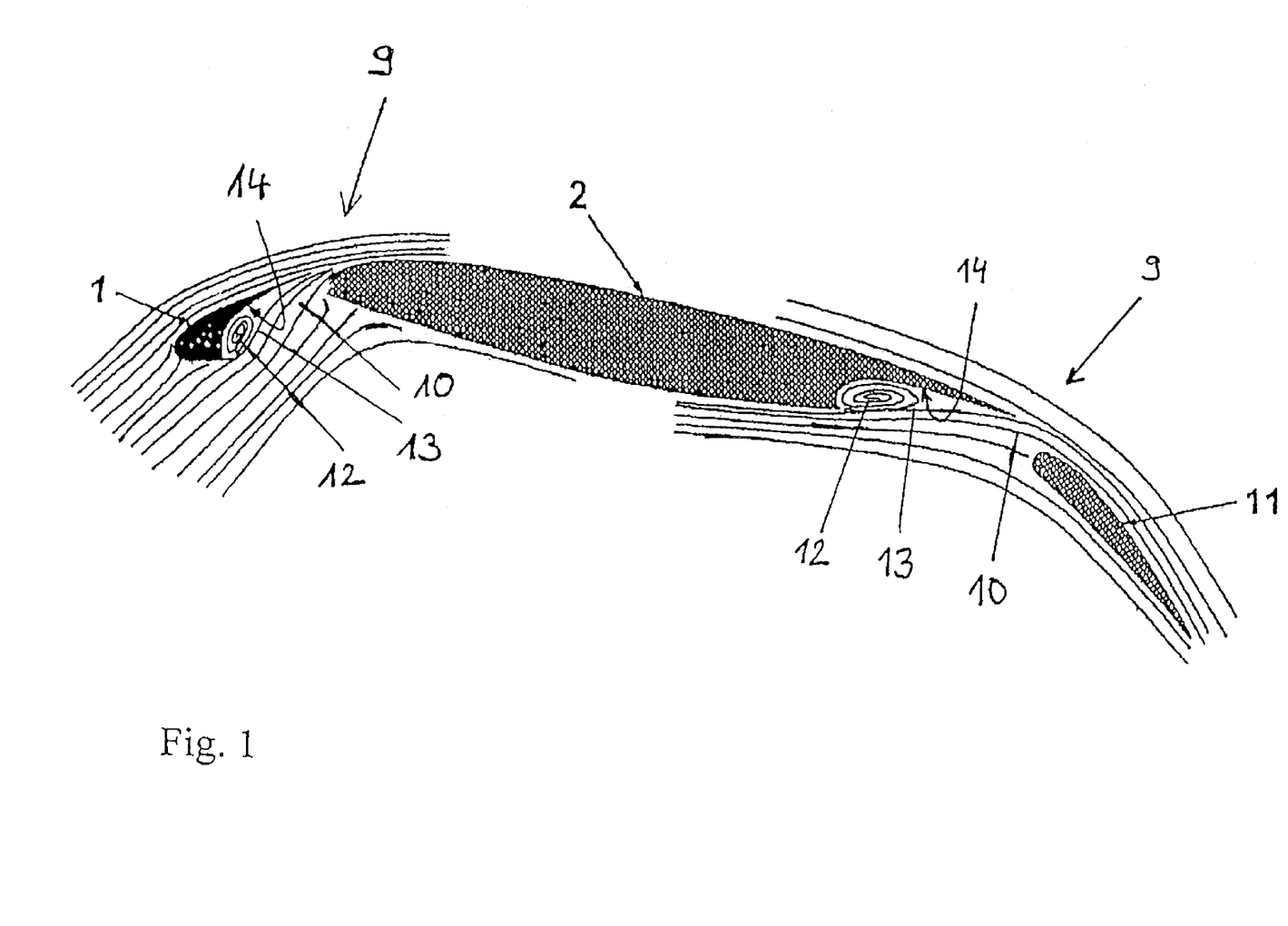
FIG. 1 shows a cross-sectional view of an aircraft wing having supplementary wings in the form of a slat and a landing flap in the extended state, as well as the air which flows along the flow lines for the wing and supplementary wing.

FIG. 1 illustrates a exemplary main wing 2 of an aircraft on which supplementary wings in the form of a slat 1 and a landing flap 11 are situated. The supplementary wings 1, 11 are hinged to the main wing 2, and are extendable when gap regions 9 between the main wing 2 and the respective supplementary wings 1, 11 are opened. The supplementary wings 1, 11 are used to increase the lift at low speeds such as during takeoff, landing, and approach. In the extended state the supplementary wings 1, 11 open respective gap regions 9 in which a gap flow 10 forms for the air flowing between the supplementary wing 1, 11 and the main wing 2 and the respective vortex flow regions 12. The vortex flow regions 12 form within profile curvatures 14 in the shape of a channel which are used to establish an essentially smooth connection of the supplementary wings 1, 11 and the main wing 2 in the retracted state. The vortex flow regions 12 fluctuate intensely and result in undesirable noise generation, since continuous turbulence balls enter the accelerated gap flow 10 via the separation flow lines 13 between the vortex flow regions 12 and the gap flows 10.

Figure 2:
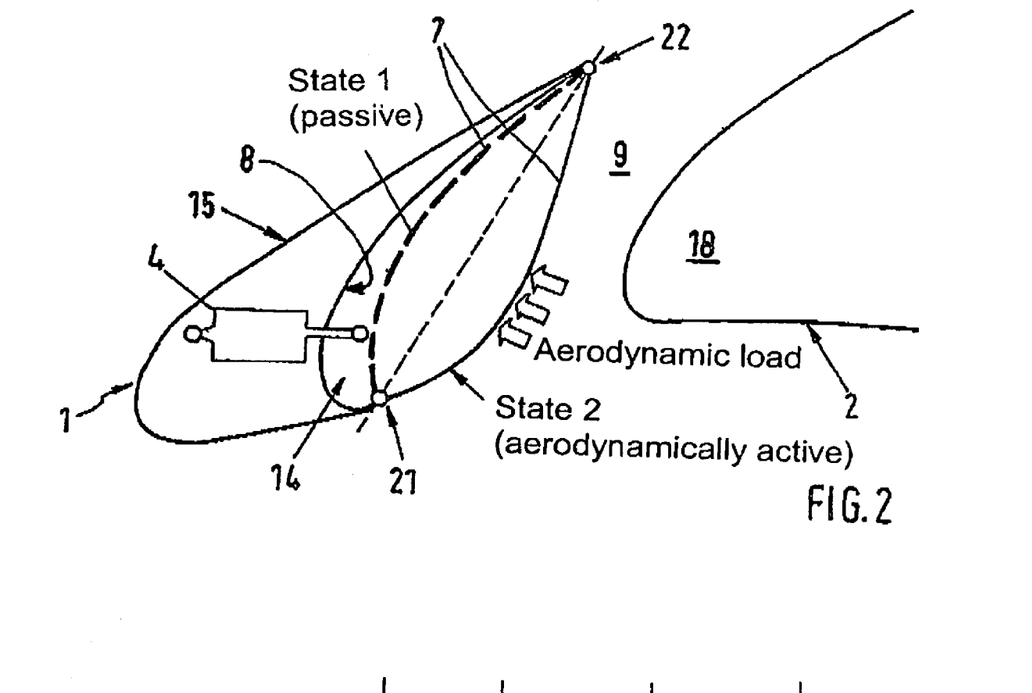
FIG. 2 shows an enlarged illustration of the front edge of a main wing and the slat in the extended state, whereby a separating surface which is movable into the gap region between the slat and main wing is provided on the back side of the slat.

FIG. 2 shows an exemplary embodiment of a system for reducing aerodynamic noise of an aircraft slat 1. The slat 1 is hinged to the main wing 2, and is extendable when the gap region 9 between the main wing 2 and the slat 1 is opened, for example by use of actuator devices referred to as slat tracks or flap tracks (not illustrated in FIG. 2). This extended state is illustrated in FIG. 2. The slat 1 has an outer cladding 15 in the front region relative to the direction of flight, and a rear profile curvature 14. The rear profile curvature 14 has the shape of a channel 8 and is adapted to the shape of the leading edge 18 of the main wing 2 to ensure an essentially smooth transition in the retracted state. Between a first articulated joint 21, provided on a line extending in the direction of the span width (i.e., spanwise, perpendicular to the plane of the drawing in FIG. 2) at the lower end of the profile curvature 14, and a second articulated joint 22, provided on a line likewise extending in the direction of the span width at the upper end of the profile curvature 14, a separating surface 7 is situated which is elongated in the direction of the span width and which, in the extended state of the slat 1, extends at least partially along the separation flow line 13 between the vortex flow region 12 and the gap flow 10 for the air flowing in the gap region 9 between the slat 1 and the main wing 2 (also see FIG. 1).

In general, the exemplary separating surface 7 may be an n-stable surface which using an actuator device 4 can be moved between at least one of the n-stable states and at least one additional state. The contour conformation and the force-distance characteristic of the separating surface 7 may be determined, for example, by use of the known Euler's strut formulas (also see FIG. 3). Of course, other known methods may also be used for this purpose.

In the exemplary embodiment shown in FIG. 2, the separating surface 7 is a bistable (n=2) surface which is able to assume two stable positions, namely, the states 1 and 2 illustrated in FIG. 2. In the stable state 1 the separating surface 7 assumes a position that is retracted from the gap region 9 and in which the slat 1 is retractable on the main wing 2 when the gap region 9 is closed (shown as a dashed line). When the slat 1 is extended and therefore the gap region 9 is opened, in the stable state 2 the bistable separating surface 7 assumes a position that is advanced into the gap region 9; i.e., the separating surface 7 is situated in the gap region 9 along the separation flow line 13 (shown as a solid line in FIG. 1) in order to separate the vortex flow region 12 from the gap flow 10 and thus reduce the noise radiation. In other words, state 1 corresponds to an aerodynamically inactive state which allows the slat 1 to engage the main wing 2, and state 2 corresponds to an aerodynamically active state; i.e., in this case an aerodynamic contour is provided for reducing the noise-generating turbulence formation.

Figure 3:
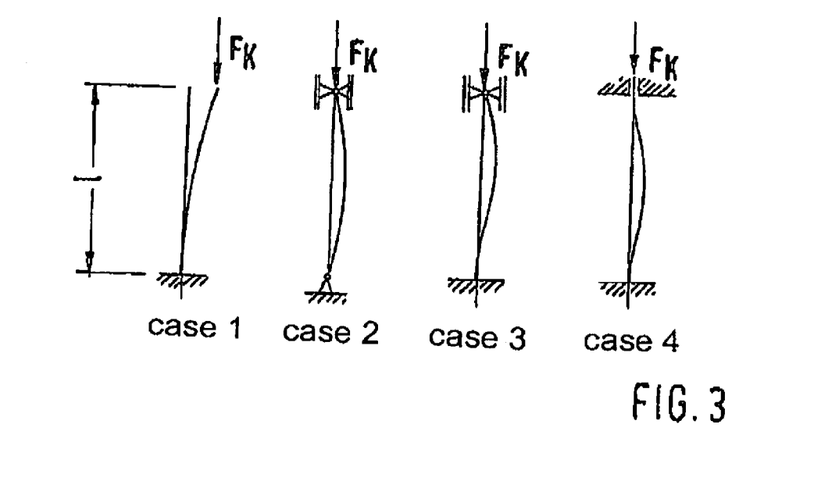
FIG. 3 shows a schematic illustration of the four Euler's buckling cases.

The contour conformation of the separating surfaces 7 results from the four known Euler's buckling cases schematically illustrated in FIG. 3. FIG. 3 shows these with the boundary conditions of clamped/free (case 1), articulated/articulated (case 2), clamped/articulated (case 3), and clamped/clamped (case 4). In principle, each of these cases may be used in the present invention.

In FIG. 2 the exemplary separating surface 7 is movably, rotatably supported on both sides via the articulated joints 21, 22, so that the separating surface 7 is able to assume two stable buckling states corresponding to case 2 of the four Euler's buckling cases. In other words, by actuation of the actuator device 4 the separating surface 7 is able to "snap" between the two stable states 1 and 2 shown in FIG. 2, which is also colloquially referred to as the "clicker principle." As the result of actuation of the actuator device 4, the separating surface 7 is "switched" from one stable state to the other stable state. For residing in the particular stable state an actuator device is not necessary. Thus, not only is the control of the actuator device simplified, but power may also be conserved in the case of an electrically driven actuator. In addition, an extended separating surface 7, for example, in the stable state 2, having elastic structural properties may also automatically snap to state 1 when the slat 1 enters in contact with the main wing 2. This ensures protection from breakdowns in a technically simple manner, so that in an emergency the retraction of the slat 1 is not hindered by the separating surface 7.

In one exemplary embodiment, it is practical for the bistable separating surface 7 to be composed of a flexible planar material. The dimensions of the separating surface 7 between the lines extending in the direction of the span width, along which the separating surface 7 is supported on the articulated joints 21, 22, are preferably larger than the straight line distance between these lines. It is also advantageous for the contour of the separating surface 7 in the retracted position (state 1) to substantially correspond to the contour of the channel 8.

Figure 4A:
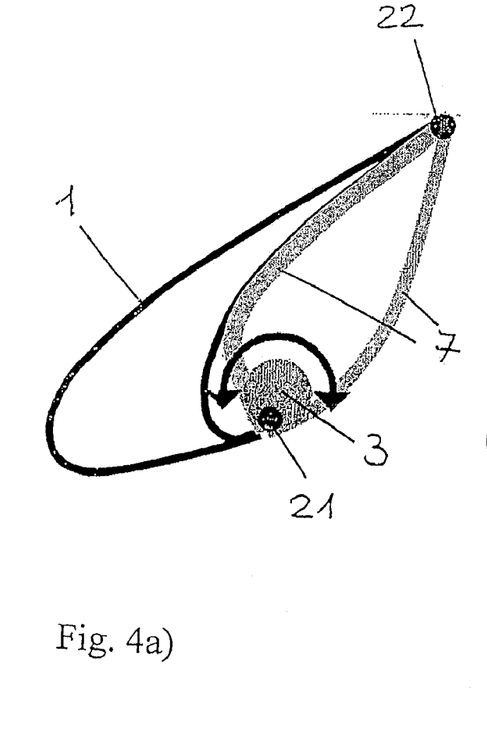
FIGS. 4a) through c) show cross-sectional views of a slat having a bistable separating surface which may be moved into the gap region, with various types of actuation according to three additional exemplary embodiments of the invention.
Figure 4B:
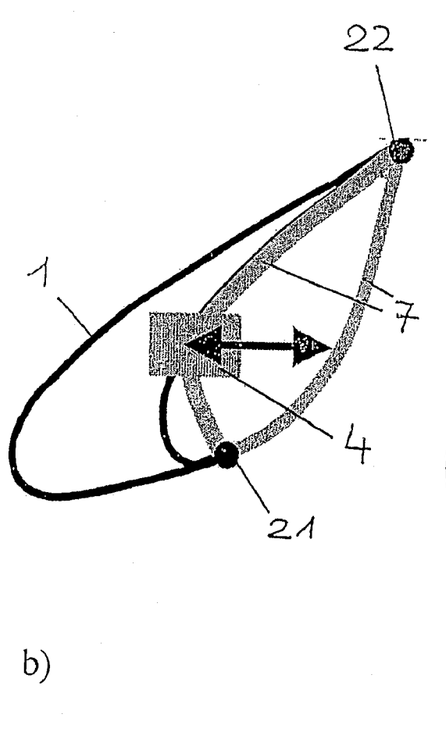
Figure 4C:
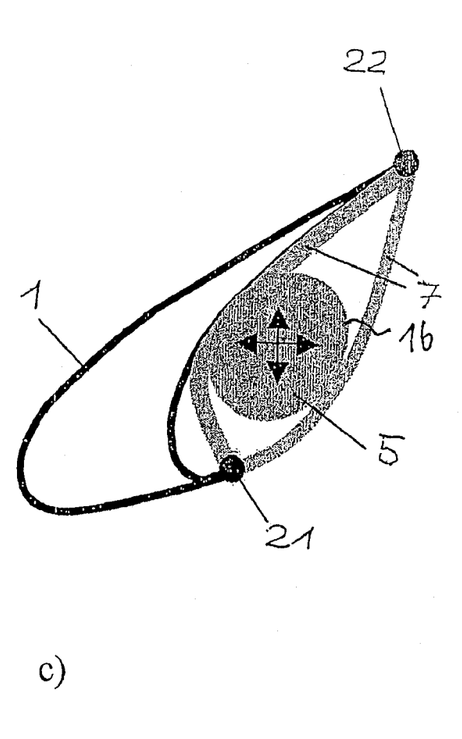

FIG. 4 illustrates three alternative exemplary types of actuation of the separating surface 7 by use of actuator devices 3, 4, or 5, respectively.

In the exemplary embodiment according to FIG. 4(a), the actuator device 3 includes a rotary actuator which for actuation of the separating surface 7 is coupled thereto on a side at which the separating surface 7 is supported on the articulated joint 21. The separating surface 7 may be brought from state 1 into state 2, and vice versa, by rotating the rotary actuator 3 in one of the two directions indicated by the arrows. In this case the actuator is double-acting, since it produces force effects in various directions.

In FIG. 4(b) the actuator device 4 is a linear actuator which is coupled to the separating surface 7 in such a way that the latter may be moved from a stable state 1 into the other stable state 2, and vice versa, as indicated by the two arrows.

In FIG. 4(c) the actuator device 5 is pneumatically or hydraulically actuated via a fluid so that a displacement body 16 may be increased or decreased in size, as shown by the arrows. In this exemplary embodiment, the separating surface 7 may be moved between the stable states 1 and 2.

Figure 5A:
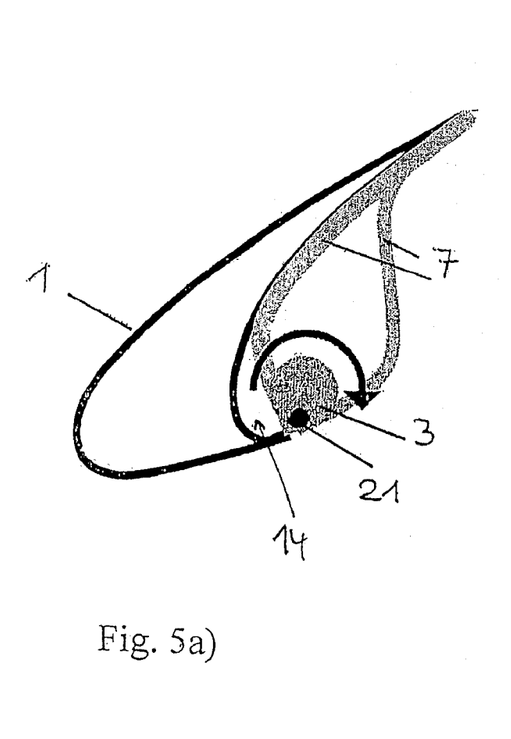
FIGS. 5a) through c) show cross-sectional views of a slat having a monostable separating surface which may be moved into the gap region, with various types of actuation according to three additional exemplary embodiments of the invention.

FIG. 5 shows a further exemplary embodiment of a system for reducing aerodynamic noise on the slat 1 of an aircraft using different actuator devices, in which a monostable (n=1) separating surface 7 is used. In this embodiment, the separating surface 7 is supported at the lower end of the profile curvature 14 along a line extending in the direction of the span width by using a first articulated joint 21, whereas on its other end the separating surface 7 is fixedly clamped to the upper end of the profile curvature 14 along a line extending in the direction of flight. This results in a monostable (n=1) configuration of the separating surface 7, similar to the third Euler's buckling case shown in FIG. 3. The separating surface 7 automatically assumes a stable state in which it is in a position that is retracted from the gap region 9 into the profile curvature 14, thereby preventing the slat 1 from engaging the main wing (not illustrated in FIG. 5). When the gap region 9 is opened by extending the slat 1, by actuation of the actuator device 3, 4, or 5, the separating surface 7 may be brought into an advanced position in which the separating surface 7 separates or occupies the vortex flow region 12 (see FIG. 1). The separating surface 7 is thus held in this advanced position as long as the actuator device 3, 4, or 5 is active. If the actuation of the actuator device 3, 4, or 5 ends or the actuator devices 3, 4, or 5 breaks down, the separating surface 7 automatically returns to its stable state, i.e., the retracted position. Breakdown protection is thus ensured in a very simple manner, so that in an emergency the retraction of the slat is guaranteed. For this purpose the separating surface 7 may have spring-elastic structural properties, achieved, for example, by using a flexible planar material. Additionally or alternatively, separate urging devices (not illustrated), in particular a spring device, may also be provided to automatically establish the stable state.

The exemplary actuator device may once again be a rotary actuator (FIG. 5(a)) which is coupled to the separating surface 7 in the region of the articulated joint 21. In the exemplary embodiment shown in FIG. 5(b), the actuator device 4 is a linear actuator which is coupled to the separating surface 7 in such a way that the separating surface is moved from its retracted stable state to the advanced state when the linear actuator 4 is actuated. Lastly, in the exemplary embodiment of FIG. 5(c) the actuator device 5 is a hydraulic or pneumatic fluid actuator which is formed by a displacement body 16 situated in the vortex flow region 12 (see FIG. 1). The separating surface 7 is brought from the retracted position into the advanced position by enlarging the displacement body by using the fluid which flows into same.

Figure 6A:
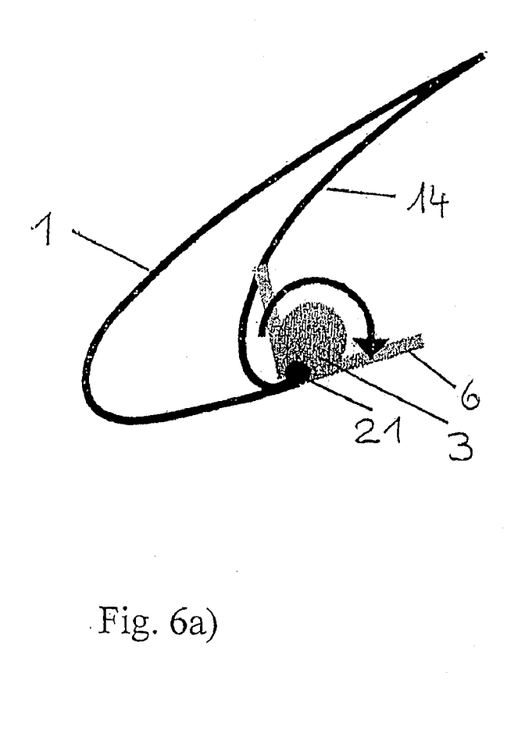
FIGS. 6a) through c) show cross-sectional views of a slat, each having a separating surface which may be moved into the gap region, with various types of actuation according to three additional exemplary embodiments of the invention.
Figure 6B:
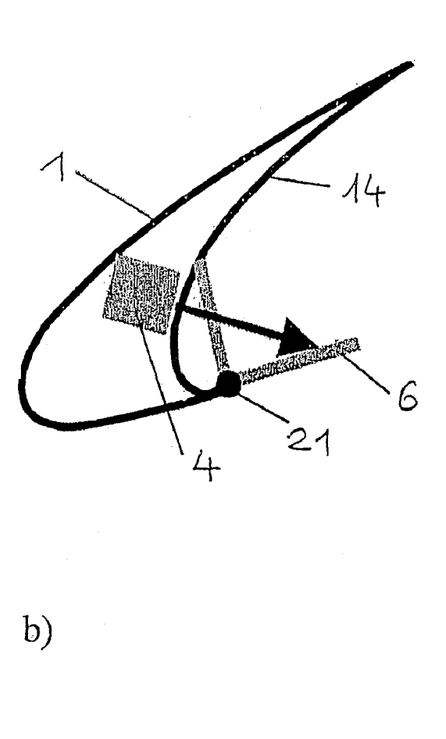
Figure 6C:
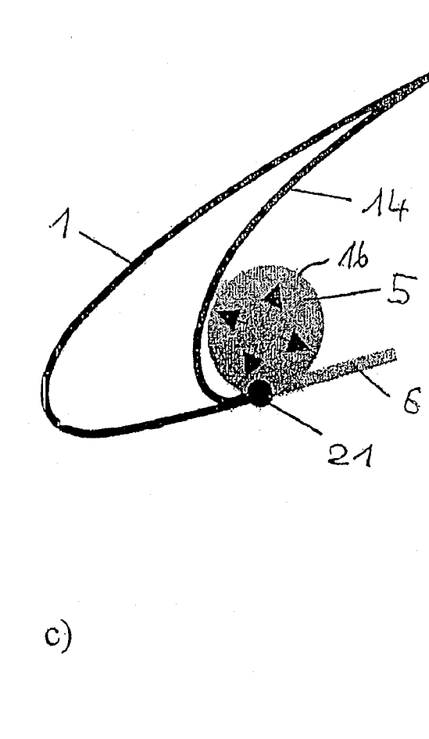

FIG. 6 shows a further exemplary embodiment of a system for reducing aerodynamic noise on the slat 1 by use of different actuator devices, a separating surface 6 being provided which extends only partially along the separation flow line 13 between the vortex flow region 12 and the gap flow 10 (see FIG. 1). The exemplary separating surface 6 once again has a monostable (n=1) design so that it automatically assumes a stable state in which the separating surface is retracted from the gap region 9 into the profile curvature 14, so that the slat 1 is retractable on the main wing 2 when the gap region 9 is closed. By using one of the actuator devices 3, 4, or 5 the separating surface 6 may be brought into an advanced position in which it partially separates the vortex flow region 12 from the gap flow 10. After actuation of the actuator device 3, 4, or 5 ends, the separating surface 6 automatically returns, for example by the action of a spring not illustrated in FIG. 6, to its stable state, i.e., to the retracted position. In this embodiment also, a rotary actuator 3 (FIG. 6(a)), a linear actuator 4 (FIG. 6(b)), or a fluid, i.e., pneumatic or hydraulic, actuator (FIG. 6(c)) may be used as one of the actuator devices.

Figure 7:
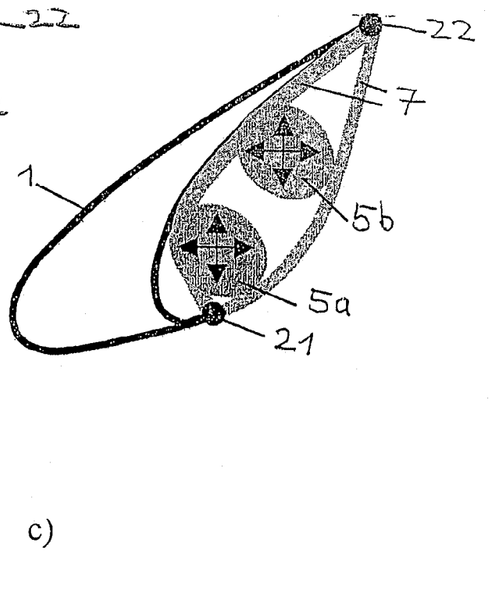

FIG. 7 illustrates three further exemplary embodiments which correspond to the exemplary embodiments illustrated in FIG. 4 with respect to the design of the separating surface 7. In this case, the embodiment has a bistable supported separating surface 7 which may be moved between the two stable states 1 and 2, as explained in conjunction with FIG. 4.

Figures 7, 7A:
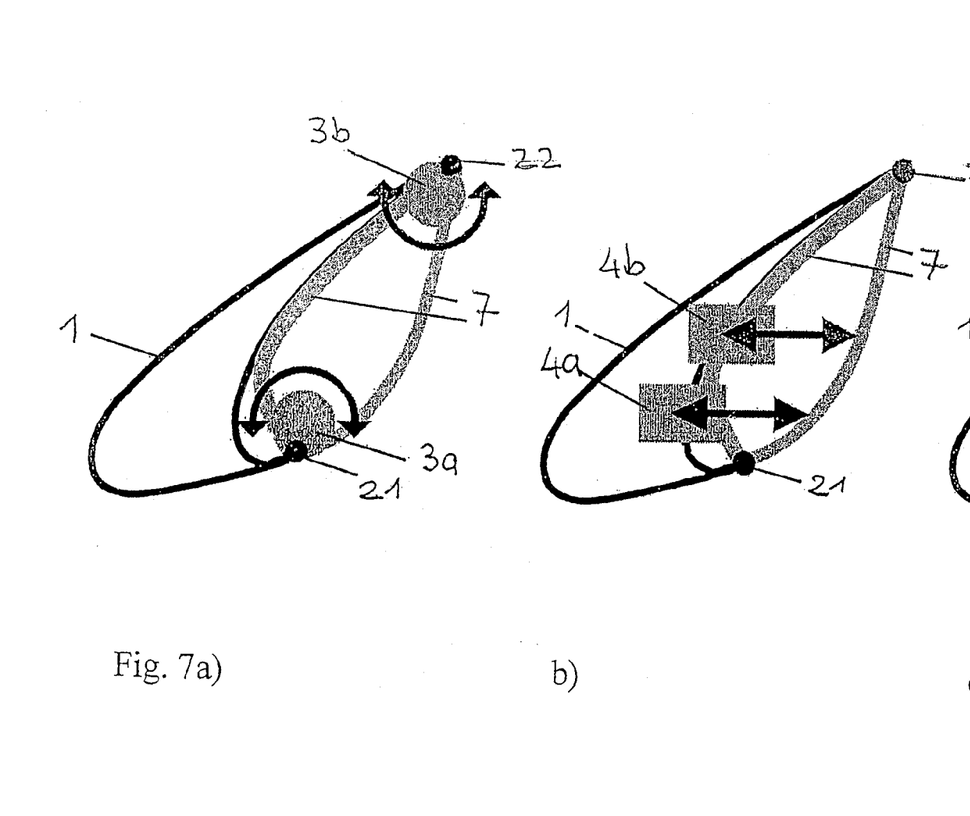
FIGS. 7a) through c) show cross-sectional views of a slat having a separating surface which may be moved into the gap region, and which, has a bistable design with double-redundant actuation.

As illustrated in this embodiment, each of the actuator devices has a double-redundant design.

In the exemplary embodiment of FIG. 7(a) two rotary actuators 3a, 3b are provided which are coupled to the separating surface 7 at both sides of the separating surface 7 in the region of the articulated joints 21 or 22 in order to move the separating surface between the two stable states 1 and 2.

In the exemplary embodiment of FIG. 7(b) two linear actuators 4a, 4b are provided in parallel, and are coupled to the separating surface 7 for moving the same between the two stable states 1 and 2.

In the exemplary embodiment of FIG. 7(c) two fluid, i.e., hydraulically or pneumatically acting, actuators 5a, 5b are provided, which when actuated move the separating surface 7 between the stable state 1 and the stable state 2.

In the described exemplary embodiments the rotary actuators 3; 3a, 3b and the linear actuators 4; 4a, 4b may be driven by servomotors or electromagnets, or may be pneumatically or hydraulically actuated.

According to a further alternative embodiment, the actuator device for a monostable, bistable, or n-stable (n≧3) separating surface may also be provided in the form a cable, lever, or drive pin which may optionally be kinematically coupled to an actuator device (slat track or flap track) for retracting or extending the supplementary wing. Such actuator devices are usually fixedly connected to the supplementary wing and movably supported in the main wing. A particularly simple actuator mechanism may be achieved by using a corresponding coupling.

In the exemplary embodiments described above, in addition to a monostable or bistable design of the separating surface 6, 7 an n-stable (n≧3) design may also be used, in which the separating surface 6, 7 may assume n (n≧3) stable states between which the separating surface may be moved by actuation of the actuator devices 3; 3a, 3b; 4; 4a, 4b; or 5; 5a, 5b. The n-stable separating surface 6, 7 thus assumes a configuration which in at least one of its stable states is in a position that is retracted from the gap region 9, and in which the supplementary wing 1 is retractable on the main wing 2 when the gap region 9 is closed, and further in which the n-stable separating surface 6, 7 in at least one of its other stable states assumes an advanced position by extension of the gap region 9 opened by the supplementary wing 1, wherein the separating surface at least partially separates the vortex flow region 12 from the gap flow 10, or alternatively occupies the space thereof.

The stable states of the separating surface 6, 7 may be formed by the structural properties of the planar material forming the separating surface 6, 7, and/or by use of additional devices coupled to the separating surface 6, 7, for example spring devices. Alternatively, additional devices which are fluidly, i.e., hydraulically or pneumatically, actuated may be provided, so that the separating surface 6; 7 is maintained in the respective stable states. For a bistable or n-stable (n≧3) separating surface, a locking device similar to a bicycle connection may also be provided in order to "switch" between the stable states.

According to the exemplary embodiment shown in FIG. 6, for the case of a bearing that is rotatable on one side the separating surface 6 supported on one side may be formed by a rigid planar material, i.e., essentially a plate, or by a flexible planar material. For the case of a bearing surface 7 supported on both sides which is moved by "snapping" between the individual stable states, the separating surface 7 may be formed by a flexible planar material. The planar material of the separating surface 6; 7 may be a metal sheet, a fiberglass fiber-reinforced plastic (FRP), a carbon fiber-reinforced plastic (CRP), a fiber-reinforced polymer, or a fiber-reinforced elastomer, in the case of a rigid planar material as well as a flexible planar material.

In the figures, exemplary embodiments have been explained in which the system for reducing aerodynamic noise at a slat 1 has been implemented. However, the corresponding measures may also be implemented when the supplementary wing is a landing flap 11. In this case, the profile curvature 14 in which the separating surface 6, 7 is provided is situated on the back side of the main wing 2, as shown in FIG. 1.

The following list of reference numerals is provided to clarify the description of the exemplary embodiment.

LIST OF REFERENCE NUMERALS

1 Supplementary wing (slat)
2 Main wing
3; 3a; 3b Actuator device
4; 4a; 4b Actuator device
5; 5a; 5b Actuator device
6 Separating surface
7 Separating surface
8 Channel
9 Gap region
10 Gap flow
11 Supplementary wing (landing flap)
12 Vortex flow region
13 Separation flow line
14 Profile curvature
15 Outer cladding
16 Displacement body
18 Front edge of main wing
21 Articulated joint
22 Articulated joint The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system for reducing aerodynamic noise of a supplementary wing of an aircraft, comprising:
 a portion of the supplementary wing hinged to the main wing, extendable to open a gap region between the main wing and the supplementary wing;

a separating surface movable into the gap region when the supplementary wing is extended, the separating surface extending at least partially along a separation flow line between a vortex flow region and a gap flow region of air flowing in the gap region between the supplementary wing and the main wing, the separation surface being an n-stable surface; and an actuator device for moving the separating surface between at least one stable state position and at least one additional position;

wherein the actuator device comprises a rotary actuator coupled to the separating surface on at least one side on which the separating surface is supported along a line extending in the spanwise direction, thereby moving the separating surface between the at least one stable state position and the at least one additional position, wherein the separating surface is a bistable surface having two stable state positions between which the separating surface is moveable by actuation of the actuator, and wherein the stable states of the bitable separating surface are automatically established by at least one of spring-elastic structural properties of the separating surface, locking devices, and a spring device.

2. System according to claim 1, wherein the actuator device is driven by at least one of a servomotor, an electric motor, and an electromagnet.

3. System according to claim 1, wherein the actuator device comprises one of a pneumatic and hydraulic actuator.

4. System according to claim 1, wherein, in one of the stable state positions, the bistable separating surface assumes a position retracted from the gap region thereby permitting retraction of the supplementary wing into the main wing when the gap region is closed, and wherein, in another stable state position, the bistable separating surface assumes an advanced position in which the separating surface at least partially separates the vortex flow region from the gap flow region when the gap region is opened by extension of the supplementary wing.

5. System according to claim 1, wherein the separating surface is an n-stable surface having at least three stable state positions, the separating surface being movable between the at least three stable state positions by actuation of the actuator device.

6. System according to claim 5, wherein, in at least one of the stable state positions, the n-stable separating surface assumes a position retracted from the gap region thereby permitting retraction of the supplementary wing in the main wing when the gap region is closed, and wherein, in at least another of the stable state positions, the n-stable separating surface assumes an advanced position in which the separating surface at least partially separates the vortex flow region from the gap flow region when the gap region is opened by extension of the supplementary wing.

7. System according to claim 1, wherein the separating surface at least partially covers the vortex flow region and is supported on both sides along lines extending in a spanwise direction.

8. System according to claim 7, wherein the separating surface is supported in an articulated manner on both sides along the lines extending in the spanwise direction.

9. System according to claim 7, wherein the separating surface is fixedly clamped on one side, and is supported in an articulated manner along the line extending in the spanwise direction on another side.

10. System according to claim 7, wherein the separating surface is fixedly clamped on both sides along the lines extending in the spanwise direction.

11. System according to claim 1, wherein the actuator device comprises a linear actuator coupled to the separating surface for moving the separating surface between the at least one stable state position and the at least one additional position.

12. System according to claim 11, wherein the actuator device is driven by at least one of a servomotor, an electric motor, and an electromagnet.

13. System according to claim 11, wherein the actuator device comprises one of a pneumatic and hydraulic actuator.

14. System according to claim 1, wherein the actuator device is one of a doubly and multiply redundant design.

15. System according to claim 1, wherein, in one of the stable state positions, the bistable separating surface assumes a position retracted from the gap region thereby permitting retraction of the supplementary wing into the main wing when the gap region is closed, and wherein, in another stable state position, the bistable separating surface assumes an advanced position in which the separating surface at least partially occupies the vortex flow region when the gap region is opened by extension of the supplementary wing.

* * * * *